United States Patent [19]

Shah et al.

[11] 3,789,902
[45] Feb. 5, 1974

[54] METHOD FOR CONCENTRATING DILUTE ACIDIC SOLUTIONS
[75] Inventors: Indravadan S. Shah, Forest Hills, N.Y.; John B. Rinckhoff, Lakeland, Fla.
[73] Assignee: Chemical Construction Corporation, New York, N.Y.
[22] Filed: June 18, 1971
[21] Appl. No.: 154,366

[52] U.S. Cl........... 159/49, 159/13 C, 159/DIG. 19, 159/4 A, 159/48 L
[51] Int. Cl........ B01d 1/16, B01d 1/22, B01d 1/16
[58] Field of Search...159/13 A, 13 C, 4 A, 49, 159/DIG. 19, 16 A, 48 L; 23/306, 61.113

[56] References Cited
UNITED STATES PATENTS

| 3,638,708 | 2/1972 | Farin | 159/4 A X |
|---|---|---|---|
| 2,818,917 | 1/1958 | Vincent | 159/48 |
| 3,057,700 | 10/1962 | Gross | 23;159/383;13 C UX |
| 3,211,538 | 10/1965 | Gross et al. | 159/4 A X |
| 3,275,062 | 9/1966 | Williams | 159/4 A |
| 3,439,724 | 4/1969 | Mason | 159/13 C |
| 3,574,051 | 4/1971 | Shah | 159/47 WL |
| 3,349,546 | 10/1967 | Rogers | 55/227 |

Primary Examiner—Jack Sofer
Attorney, Agent, or Firm—J. L. Chaboty

[57] ABSTRACT

Dilute aqueous acidic solutions are concentrated by direct contact with a hot gas stream in a venturi contactor, under specific conditions of the ratio of total solution flow rate to hot gas flow rate, and hot gas flow velocity at the throat section of the venturi passage, so that the acidic liquid solution is concentrated by evaporation of water vapor into the hot gas stream without the formation of an acid mist or other contaminants in the gas stream.

7 Claims, 1 Drawing Figure

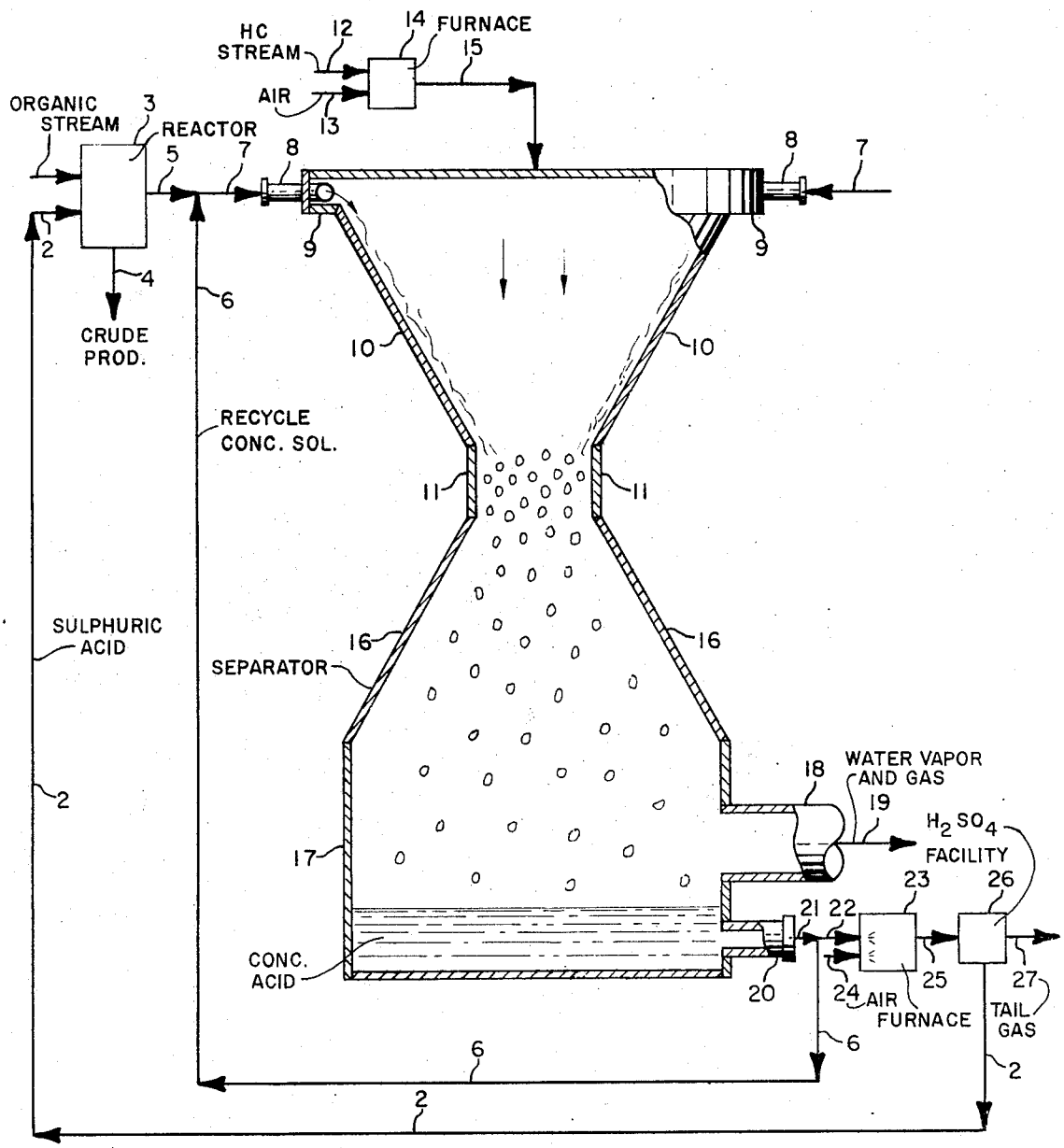

METHOD FOR CONCENTRATING DILUTE ACIDIC SOLUTIONS

BACKGROUND OF THE INVENTION

1. Field of the Invention

The invention relates to the evaporative concentration of dilute aqueous acidic solutions, such as spent sulfuric acid typically derived from petroleum refining or the manufacture of methyl methacrylate or caprolactam. These spent acids must be concentrated, prior to combustion in furnaces which generate a sulfur dioxide-rich gas stream for usage in sulfuric acid manufacture. Other dilute aqueous acidic solutions which may be concentrated by the method of the present invention include pickle liquors derived from the treatment of metallic surfaces with acids, acid mine waste waters, aqueous solutions of organic acids, and the like.

2. Description of the Prior Art

The evaporative concentration of a sludge acid prior to high temperature decomposition is described in U.S. Pat. No. 2,406,930. The general concept of evaporation of liquid solutions in Venturi-type contactors is generally disclosed in U.S. Pat. Nos. 2,118,803; 2,937,141; 3,211,538; 3,212,235; 3,275,062; 3,284,064; 3,349,546 and 3,439,724, and in the publication Chemical Engineering, issue for Aug. 26, 1968, pages 54 and 56. In practice, sludge acids and the like have generally been commercially concentrated in drum-like concentrators or the like.

SUMMARY OF THE INVENTION

In the present invention, dilute aqueous acidic solutions are concentrated in an improved manner, by means of a method in which the solution is contacted with a hot drying gas within a vertically oriented venturi passage or a contactor of the venturi configuration. The dilute aqueous acidic solution flows downwards on the inner surface of the converging passage and the hot gas stream, generated or produced at an initial temperature above 200°C, is passed downwards through the venturi passage. The ratio of total solution flow rate to hot gas flow rate is maintained in the range of 1 liter per actual cubic meter to 10 liters per actual cubic meter, and the dilute liquid solution is projected into the high velocity hot gas at the throat section of the venturi passage, so that water is evaporated from the aqueous solution into the gas stream. A gas velocity in the range of 10 meters/second to 60 meters/second is maintained within the throat section of the venturi passage. The resulting concentrated liquid solution is separated from the moisture-laden cooled gas stream which is now at a reduced temperature in the range of 100°C to 150°C.

The principal advantage of the invention is that operation within the ranges and limitations of the method as enumerated supra serves to effectively concentrate the acidic liquid solution without the formation of an acid mist or fog, and without the generation of acid decomposition products in the cooled exit gas stream. Another advantage is that the method is low in operating cost, and the equipment is of low capital cost.

It is an object of the present invention to provide an improved method for the concentration of dilute aqueous acidic solutions.

Another object is to provide a method for evaporative concentration of dilute aqueous acidic solutions by contact with a hot drying gas.

A further object is to concentrate dilute aqueous acidic solutions by evaporative contact with a hot drying gas, without the formation of an acid mist.

An additional object is to provide an improved method for evaporative concentration of a dilute aqueous acidic solution by contact with a hot drying gas in a venturi contactor.

These and other objects and advantages of the present invention will become evident from the description which follows.

DESCRIPTION OF THE DRAWING AND PREFERRED EMBODIMENTS

Referring now to the drawing, a flowsheet of a preferred embodiment of the invention is illustrated, in which a dilute aqueous acidic solution derived from the manufacture of methyl methacrylate and principally containing dissolved ammonium bisulfate and sulfuric acid is concentrated from an initial water content of about 41 percent by weight to a final water content of about 20 percent by weight, prior to sulfuric acid recovery from the acidic residue.

Organics stream 1 and recycled concentrated sulfuric acid stream 2 are passed into reactor 3, from which product crude methyl methacrylate is withdrawn via stream 4. A dilute aqueous acidic solution stream 5 is also withdrawn from unit 3, and stream 5 typically contains in the range of 30 percent to 60 percent water content by weight, together with dissolved ammonium bisulfate, sulfuric acid and organics. Stream 5 is preferably combined with recycle concentrated acidic solution stream 6, and the combined solution stream 7 is passed via one or a plurality of feed nozzles 8 onto the upper liquid distribution shelf 9 of the venturi concentrator. The nozzles 8 are preferably disposed substantially tangential to the circular shelf 9, so that the liquid flows from the shelf 9 and downwards on the inner surface of the inverted frusto-conical baffle 10 with a whirling circular motion. Baffle 10 forms the converging approach or inlet section of the venturi contactor-concentrator, which is also defined by the cylindrical throat baffle 11 which depends from baffle 10 and defines the throat of the venturi contactor, in which the hot drying gas is accelerated to high velocity for contact with dispersed liquid, as will appear infra.

A hot drying gas generated or produced and derived from any suitable source is passed downwards through the venturi passage defined by baffles 10 and 11. In this preferred embodiment of the invention, the hot drying gas is formed by burning fluid hydrocarbon stream 12 with combustion air stream 13 in furnace 14. Stream 12 may consist of any suitable or available hydrocarbon, such as methane, propane, butane, crude oil, fuel oil, petroleum refinery residual oil, or the like. The hot drying gas stream 15 emitted by furnace 14 is at a temperature generally above 200°C and preferably in the range of 200°C to 400°C, and stream 15 is now passed into the venturi concentrator and downwards within baffles 10 and 11.

The ratio of the flow rates of streams 7 and 15 is maintained in the range of between 1 liter per actual cubic meter and 10 liters per actual cubic meter, in order to attain the improved results of the present invention. In addition, in order to attain these improved results, stream 15 is accelerated to high velocity in flowing downwards through the converging passage defined by baffle 10, so that the gas velocity within the throat section defined by baffle 11 is in the range of 10 meters per second to 60 meters per second.

The downflowing liquid solution on the inner surface of baffle 10 flows downwards and is projected into the high velocity gas stream within throat 11, so that the liquid is dispersed into small droplets and rapid gas-liquid equilibrium is attained with concomitant rapid evaporation of water from the liquid into the gas phase. In addition, due to the maintenance of operating parameters as discussed supra, formation of an acid mist or fog is prevented and the gas phase does not contain any appreciable proportion of acid or acid decomposition products.

The resultant gas-liquid droplets phase formed in throat section 11 is passed downwards through the lower frusto-conical baffle 16 which depends from baffle 11 and is preferably provided as a diverging section of the venturi passage in order to conserve gas pressure drop. The gas-liquid mixture next flows into entrainment separator 17, which is any suitable means or device for separating liquid droplets from a gas stream. Thus in suitable instances unit 17 may be baffled or cyclonic or the like. The separated gas phase is removed from section 17 via duct 18, which discharges the cooled and moisture-laden gas stream 19 to a stack or the like for atmospheric dispersal, which may be carried out without danger of air pollution, due to the absence of acid mist or fog, or acid decomposition products in the cooled gas stream 19 which is now typically at a temperature in the range of 70°C to 150°C.

A pool or layer of concentrated acidic solution collects in the bottom of unit 17, and a stream of concentrated solution is removed from unit 17 via nozzle 20 as stream 21, which now typically contains in the range of 10 percent to 25 percent water content. Stream 21 is now preferably divided into stream 6, which is recycled as described supra, and stream 22, which is suitable for combustion to generate a sulfur dioxide-rich gas stream. Stream 22 is passed into combustion furnace 23 together with combustion air stream 24, and the resulting suflur dioxide-rich gas generated in furnace 23 is preferably passed via stream 25 into sulfuric acid production facility 26, in which the gas stream is dried, the sulfur dioxide content of the dried stream 25 is catalytically oxidized to sulfur trioxide and the sulfur trioxide is absorbed in concentrated sulfuric acid to form further sulfuric acid, which is withdrawn from unit 26 via stream 2 and recycled as described supra. A tail gas stream 27 substantially devoid of sulfur oxides is also discharged from unit 26.

Numerous alternatives within the scope of the present invention will occur to those skilled in the art. The present method is especially applicable to spent sulfuric acid solutions such as dilute aqueous solutions derived from the manufacture of methyl methacrylate or caprolactam, or sludge acids derived from petroleum refining or the like. In some instances the concentrated solution recycle stream 6 may be omitted, in which case the total solution stream 7 would consist solely of dilute aqueous acid solution such as stream 5. Stream 15 may alternatively be a flue gas or the like, derived from a steam boiler or other suitable source. The baffle 16 may be omitted in suitable instances, or replaced by a cylindrical connecting member which would extend to unit 17.

An example of pilot plant testing of the method of the present invention will now be described.

Example

The method of the invention was tested in a series of runs in an acid concentrator pilot plant. The feed acid was a residual spent acid from methyl methacrylate manufacture, which had the following composition, by weight:

| Water | 41% |
| Sulfuric Acid | 6.5% |
| Ammonium Acid Sulfate | 50.0% |
| Organics | 2.5% |

All runs utilized a 425°C feed gas obtained by burning natural gas in a furnace. The acid feed rate was set at a maximum value that would give 20 percent by weight water in the product acid. The acid recycle rate and venturi throat diameter was varied to determine their effect on the process conditions. An acid residue containing 20 percent water was produced in the venturi concentrator. In general, the concentrator off-gas contained less than 5 mg./cu.ft. sulfuric acid mist which was reduced to less than 2 mg./cu.ft. at a pressure drop greater than 6 inches of water. The sulfur dioxide content was nil and sulfur trioxide less than 5 ppm.

The venturi concentrator was a standard venturi scrubber, 30 inches in diameter and 19 ft. high. Following is a summary of test results.

Summary of Test Results

| Run No. | 1 | 2 | 3 | 4 | 5 | 6 | 7 | 8 |
|---|---|---|---|---|---|---|---|---|
| Length of Run, hrs. | 2 | 3 | 7 | 7 | 7 | 7 | 7 | 7 |
| Initial Gas Temp. (°C) | 442 | 430 | 435 | 433 | 431 | 431 | 430 | 430 |
| Final Gas Temp. (°C) | 135 | 122 | 130 | 135 | 120 | 119 | 116 | 119 |
| Recycle Acid Temp. (°C) | 99 | 95 | 97 | 97 | 96 | 96 | 97 | 96 |
| Recycle Acid Flow Rate (gpm) | 36 | 23.2 | 23.5 | 23.5 | 35.0 | 35.0 | 34.8 | 34.8 |
| Feed Acid Flow Rate (gpm) | 2.5 | 2.07 | 2.05 | 2.05 | 2.2 | 2.2 | 2.5 | 2.45 |
| Final Gas Analysis: | | | | | | | | |
| Mist, mg./ft.$^3$ | 5.0 | 2.5 | 6.21 | 5.04 | 5.54 | 0.0 | 3.36 | 3.68 |
| Entertainment, mg./ft.$^3$ | 5.8 | 9.14 | 22.6 | 31.8 | 41.0 | 0.0 | 42.6 | 55.9 |
| SO$_2$, ppm | 0 | 0 | 0 | 0 | 0 | 14 | 0 | 0 |
| SO$_3$, ppm | 53 | 61 | 84 | 84 | 34 | 48 | 30 | 30 |
| NO$_x$, ppm | | | | 0 | 0 | | 27 | |

This test program proved the feasibility of the method of the present invention, for reducing the water content of acid residues from 41 percent to 20 percent by weight. It also indicated that a wider range could be handled. It was found that the sulfuric acid mist content is less than 5 mg./cu.ft. and could be reduced to less than 2 mg./cu.ft. if a pressure drop greater than 6 in. of water across the concentrator is maintained.

The pressure drop was varied by changing the throat size and liquid to gas ratio, as indicated. As the recycle rate was increased, the pressure drop increased from 3.9 to 6.3 in. of water, and the approach temperature of gas to liquid decreased from 35° to 20°C. Therefore, not only did the increased pressure drop reduce the acid mist level in the exit gas but it significantly improved the heat transfer efficiency. This allowed a 10 percent increase in feed acid flow rate. The operating parameters and ranges enumerated supra are directly related to gas pressure drop.

We claim:

1. A method for concentrating a dilute aqueous spent sulfuric acid solution containing in the range of 30 percent to 60 percent water content to a concentrated sulfuric acid solution containing in the range of 10 percent to 25 percent water content which comprises passing a hot gas stream downwards through a vertically oriented converging venturi passage provided with a lower restricted throat section, said hot gas stream being at an initial temperature above 200°C, flowing a combined aqueous acidic solution downwards on the inner surface of said converging passage at a ratio of total solution flow rate to hot gas flow rate in the range of 1 liter per actual cubic meter to 10 liters per actual cubic meter respectively, said combined aqueous acidic solution being formed by adding a concentrated sulfuric acid solution portion to said dilute aqueous spent sulfuric acid solution, whereby said combined aqueous acidic solution is projected into the high velocity hot gas at the throat section of said venturi passage and water is evaporated from said combined aqueous solution into the gas stream, said hot gas flow rate providing a gas velocity at the throat section of said venturi passage in the range of 10 meters/second to 60 meters/second, whereby the formation of an acid mist is prevented, removing a gas-liquid mixture from below said venturi passage, said gas-liquid mixture consisting of droplets of concentrated sulfuric acid solution dispersed in said gas stream, separating a stream of concentrated sulfuric acid solution containing in the range of 10 percent to 25 percent water content from the gas-liquid mixture, the remaining gas-liquid mixture comprising a gas-vapor mixture containing water vapor derived from said solution and being at a reduced temperature in the range of 70°C to 150°C is wasted to atmosphere, and dividing said concentrated sulfuric acid solution into a first portion and a second portion, said first portion being recycled as said concentrated sulfuric acid solution portion of said combined aqueous acidic solution, and said second portion being withdrawn as product concentrated sulfuric acid solution containing in the range of 10 percent to 25 percent water content and the balance essentially sulphuric acid.

2. The method of claim 1, in which said spent sulfuric acid solution contains ammonium bisulfate and is derived from the manufacture of methyl methacrylate.

3. The method of claim 1, in which said spent sulfuric acid solution is derived from the manufacture of caprolactam.

4. The method of claim 1, in which said spent sulfuric acid solution is a sludge acid derived from petroleum refining.

5. The method of claim 1, in which said hot gas stream is a flue gas derived from a fuel combustion process.

6. The method of claim 1, in which said hot gas stream is produced at an initial temperature in the range of 200°C to 400°C by burning a fluid hydrocarbon in air.

7. The method of claim 6, in which said fluid hydrocarbon is selected from the group consisting of methane, propane, butane, crude oil, fuel oil and residual oil derived from petroleum refining.

* * * * *